(12) United States Patent
Feinstein

(10) Patent No.: US 11,780,736 B2
(45) Date of Patent: Oct. 10, 2023

(54) AMMONIA PRODUCTION METHOD

(71) Applicant: ZONEFLOW REACTOR TECHNOLOGIES, LLC, Windsor, CT (US)

(72) Inventor: Jonathan Jay Feinstein, Windsor, CT (US)

(73) Assignee: ZoneFlow Reactor Technologies, LLC, Windsor, CT (US)

( * ) Notice: Subject to any disclaimer, the term of this patent is extended or adjusted under 35 U.S.C. 154(b) by 387 days.

(21) Appl. No.: 16/920,594

(22) Filed: Jul. 3, 2020

(65) Prior Publication Data
US 2021/0002141 A1    Jan. 7, 2021

Related U.S. Application Data

(60) Provisional application No. 62/871,037, filed on Jul. 5, 2019.

(51) Int. Cl.
| | |
|---|---|
| *C01C 1/04* | (2006.01) |
| *C01B 3/24* | (2006.01) |
| *C01B 3/56* | (2006.01) |
| *C01B 3/04* | (2006.01) |

(52) U.S. Cl.
CPC ............ *C01C 1/0441* (2013.01); *C01B 3/045* (2013.01); *C01B 3/24* (2013.01); *C01B 3/56* (2013.01); *C01C 1/0452* (2013.01); *C01B 2203/0216* (2013.01); *C01B 2203/042* (2013.01)

(58) Field of Classification Search
CPC ... C01C 1/0441; C01C 1/0452; C01C 1/0405; C01B 3/045; C01B 3/24; C01B 3/56; C01B 2203/0216; C01B 2203/042; C01B 2203/0233; C01B 2203/0283; C01B 2203/0415; C01B 2203/043; C01B 2203/0445; C01B 2203/068; C01B 2203/0811; C01B 2203/0894; C01B 3/384; C01B 3/025; Y02E 60/36; Y02P 20/52

See application file for complete search history.

(56) References Cited

U.S. PATENT DOCUMENTS 5,275,632 A * 1/1994 Corrigan .................. B01J 8/062
                                                                                422/204
5,639,431 A * 6/1997 Shirasaki ................ C01B 3/501
                                                                                422/212

(Continued)

*Primary Examiner* — Steven J Bos
*Assistant Examiner* — Syed T Iqbal
(74) *Attorney, Agent, or Firm* — Knobbe, Martens, Olson & Bear LLP

(57) ABSTRACT

High purity hydrogen is produced by a steam reforming hydrogen production unit with at least one of a bayonet reactor for reforming steam and a hydrocarbon, a recuperative burner, and a regenerative burner such that the steam reforming unit produces little or no steam in excess of the steam reforming process requirements. High purity hydrogen is separated from the syngas exiting the reformer via a pressure swing adsorption unit and combined with high purity nitrogen from an air separation unit as feedstock to a Haber process ammonia synthesis unit. Compressors for the ammonia synthesis unit are driven by higher efficiency drivers than are possible using the low temperature steam conventionally exported from a steam reforming unit. Compression power requirements are reduced.

17 Claims, 4 Drawing Sheets

(56) References Cited

U.S. PATENT DOCUMENTS

| | | | | |
|---|---|---|---|---|
| 5,876,469 A | * | 3/1999 | Moriya | H01M 8/0631 |
| | | | | 422/216 |
| 2008/0161428 A1 | * | 7/2008 | Strait | C07C 41/01 |
| | | | | 422/600 |

* cited by examiner

AMMONIA PRODUCTION METHOD

INCORPORATION BY REFERENCE

This application claims the benefit of U.S. Provisional Application Ser. No. 62/871,037, filed Jul. 5, 2019, titled "AMMONIA PRODUCTION METHOD," the entirety of which is incorporated by reference herein.

FIELD

The present disclosure relates to systems and methods for ammonia production, and more particularly to systems and methods including steam reforming.

SUMMARY

The systems and methods of this disclosure each have several innovative aspects, no single one of which is solely responsible for its desirable attributes. Without limiting the scope as expressed by the claims that follow, its more prominent features will now be discussed briefly.

In one aspect described herein, a mixed feed of steam and one or more hydrocarbons is reformed to produce a syngas containing hydrogen and oxides of carbon in a bayonet catalytic reactor. Reforming is performed to a peak temperature of at least 850° C. and preferably at least 900° C. Reforming is preferably performed at a ratio of moles steam to atoms of carbon in the mixed feed ("S/C ratio") less than 2.8 and more preferably less than 2.4. The reformed and cooled syngas exits the bayonet tube of the bayonet reactor at a temperature less than 860° C., preferably less than 600° C. and more preferably at a temperature less than 500° C. The reforming catalytic reactor is preferably a structured packing.

In another aspect described herein, a method of producing ammonia within a combination of a hydrogen production unit and a Haber process unit is described. The method comprises reforming reactants of steam and a hydrocarbon feedstock in a bayonet reforming reactor tube in the hydrogen production unit to produce a reformate syngas at a first temperature; cooling the reformate within the bayonet reforming reactor tube to a second temperature lower than the first temperature; separating the reformate syngas in a pressure swing adsorption unit to produce a high purity hydrogen stream containing at least 90% hydrogen by volume and a tail gas stream; separating air in an air separation unit to produce a high purity nitrogen stream containing at least 90% nitrogen by volume; combining the high purity hydrogen stream and the high purity nitrogen stream into a mixture; and compressing and processing the mixture in a Haber process unit comprising at least one compressor.

In some embodiments, at least 90% of steam raised in the hydrogen production unit is consumed in the production unit to reform the high purity hydrogen stream.

In some embodiments, the steam is generated by cooling the reformate syngas against boiler feed water in one or more heat exchangers.

In some embodiments, the one or more heat exchangers comprise a first feed water heat exchanger configured to transfer heat from the reformate syngas to heat the boiler feed water; and a second feed water heat exchanger configured to transfer heat from the reformate syngas to vaporize the heated boiler feed water; wherein the reformate syngas passes through the second feed water heat exchanger before passing through the first feed water heat exchanger.

In some embodiments, the at least one compressor is driven by a driver comprising at least one of a gas turbine, a steam turbine utilizing inlet steam at a temperature greater than 550° C., a combined cycle turbine set, or an electric motor.

In some embodiments, the bayonet reforming reactor tube is heated at least in part by combustion of the tail gas stream.

In some embodiments, processing the mixture in the Haber process unit yields liquid ammonia and a remainder gaseous mixture, and wherein at least a portion of the remainder gaseous mixture is recycled within the Haber process unit.

In some embodiments, the bayonet reforming reactor tube is heated at least in part by combustion of a portion of the remainder gaseous mixture.

In another aspect described herein, a method of producing ammonia within a combination of a hydrogen production unit and a Haber process unit is described. The method comprises reforming reactants of steam and a hydrocarbon feedstock to produce a reformate syngas in steam reforming reactor at least partially disposed within a furnace of the hydrogen production unit; separating the reformate syngas in a pressure swing adsorption unit to produce a high purity hydrogen stream containing at least 90% hydrogen by volume and a tail gas stream; separating air in an air separation unit to produce a high purity nitrogen stream containing at least 90% nitrogen by volume; combining the high purity hydrogen stream and the high purity nitrogen stream into a mixture; and compressing and processing the mixture in a Haber process unit containing at least one compressor.

In some embodiments, at least 90% of the steam raised in the steam reforming unit is consumed in the steam reforming unit to reform the reactants.

In some embodiments, the steam is generated by cooling the reformate syngas against boiler feed water in one or more heat exchangers.

In some embodiments, the one or more heat exchangers comprise a first feed water heat exchanger configured to transfer heat from the reformate syngas to heat the boiler feed water; and a second feed water heat exchanger configured to transfer heat from the reformate syngas to vaporize the heated boiler feed water; wherein the reformate syngas passes through the second feed water heat exchanger before passing through the first feed water heat exchanger.

In some embodiments, the furnace of the hydrogen production unit is heated by a burner and a heat exchanger.

In some embodiments, combustion air for the burner is preheated to at least 500° C. in the heat exchanger against combustion products of the furnace.

In some embodiments, the at least one compressor is driven by a driver comprising at least one of a gas turbine, a steam turbine utilizing inlet steam at a temperature greater than 550° C., a combined cycle turbine set, or an electric motor.

In some embodiments, the furnace is heated at least in part by combustion of the tail gas stream.

In some embodiments, processing the mixture in the Haber process unit yields liquid ammonia and a remainder gaseous mixture, and wherein at least a portion of the remainder gaseous mixture is recycled within the Haber process unit.

In some embodiments, the furnace is heated at least in part by combustion of a portion of the remainder gaseous mixture.

In some embodiments, the steam reforming reactor comprises a single pass reforming reactor tube.

In some embodiments, the steam reforming reactor comprises a bayonet reforming reactor tube.

DETAILED DESCRIPTION

Figure 1:
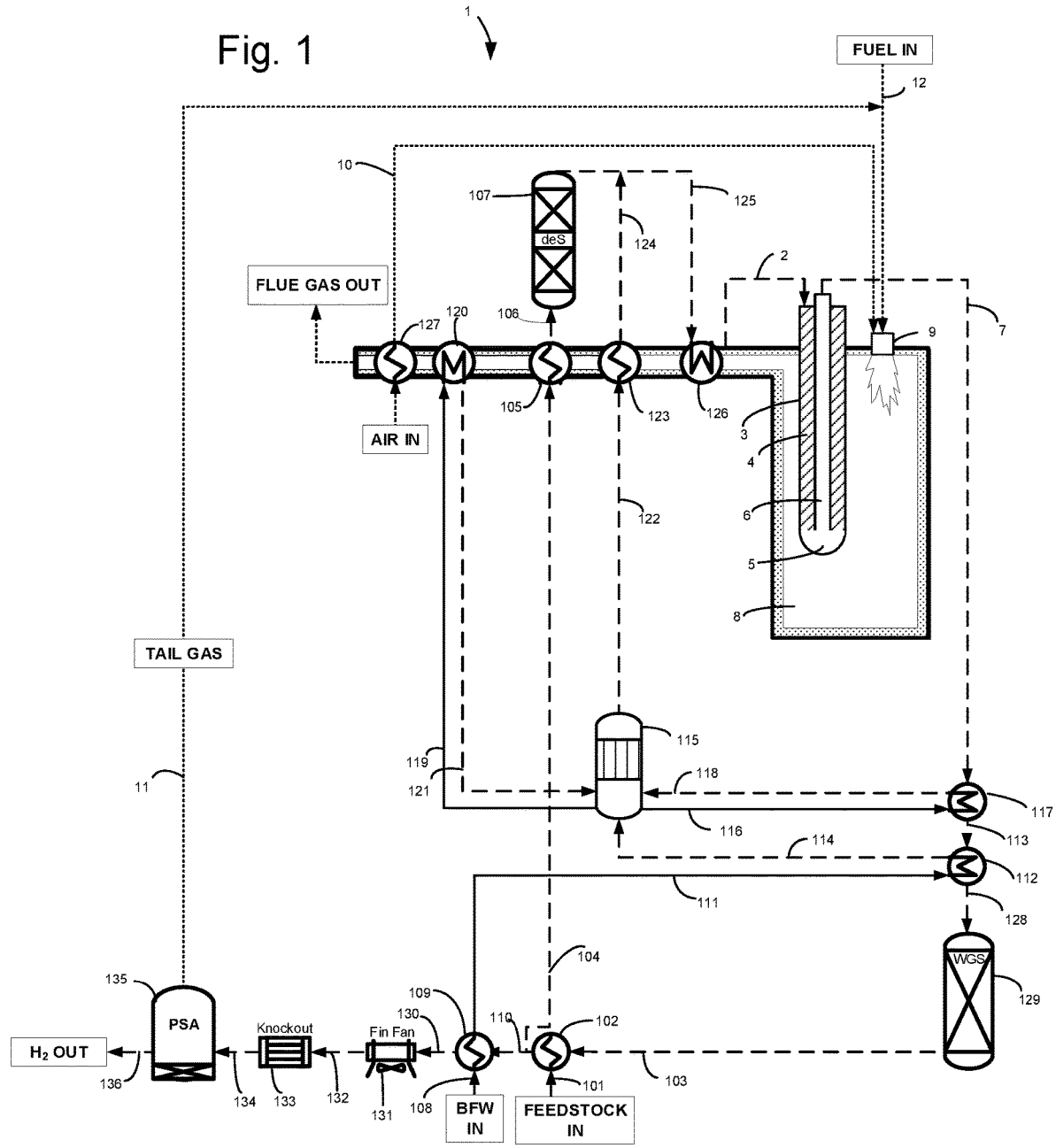
FIG. 1 schematically illustrates an example hydrogen production unit according to the present technology.

Most ammonia is currently produced via a combination of primary and secondary steam reforming to produce a gas mixture containing a ratio of three moles of hydrogen to one mole of nitrogen, followed by synthesis of that mixture into ammonia via the Haber process. The Haber process is energy intensive to compress the feedstock and recycle gas and to recompress the returns from the hydrogen recovery unit to a pressure of typically 150 to 250 bar(a) for processing in the ammonia synthesis unit. Historically, many improvements to the energy efficiency of ammonia production have been via reductions in the compression energy needed, for example, by lowering the pressure losses in the ammonia synthesis unit.

Excess steam from the steam reforming process, being otherwise unneeded, is normally utilized to drive the various compressors for the synthesis unit. Although this usage of steam is seen as synergistic, the steam exported from the steam reforming unit is poorly suited for use in a steam turbine. In the steam reforming unit, steam is generated in the recoveries of heat from syngas and from the combustion gases exiting the reformer. Because the syngas must be cooled quickly, normally against boiler feed water, to temperatures below those at which the syngas is corrosive to the equipment and thereby minimize such corrosion, the steam cannot conventionally be superheated to temperatures above the range of 500° to 550° C. Even at elevated pressure, steam of this quality has only 30% thermal efficiency when used in a steam turbine. By comparison, hotter steam, a gas turbine, or a combined cycle of natural gas and steam could reach thermal efficiencies of up to 60%. To take advantage of higher thermal efficiencies for driving compressors without forfeiting the energy value of excess steam from reforming, the excess steam can be utilized in another, more effective way or the amount of low-quality steam created by the reformer can be reduced.

Steam reformers, as configured for ammonia production, unfortunately create particularly large amounts of export steam. Reforming is first carried out in a primary reformer to leave enough unreacted methane in the syngas exiting the primary reformer to combust in an exothermic secondary reformer with the amount of oxygen in air that contributes approximately one molecule of nitrogen for each three molecules of hydrogen in the syngas from the primary reformer. This method accomplishes the desired ratio of hydrogen to nitrogen for ammonia synthesis but results in a relatively high syngas temperature exiting the secondary reformer, causing a relatively high production of low temperature steam to cool the syngas to a temperature less than 600° C. to avoid corrosion by metal dusting.

Accordingly, some ammonia production methods described herein include reforming steam and a hydrocarbon in a primary reformer, separating a high purity stream of hydrogen from the syngas exiting the reformer using a pressure swing adsorption unit or "PSA" unit, separately cryogenically separating a high purity stream of nitrogen from ambient air, combining the high purity hydrogen stream with the high purity nitrogen stream in a 3-to-1 hydrogen-to-nitrogen ratio, and finally compressing the gases as feedstock to an ammonia synthesis unit of the Haber process. Like the typical methods described above, this alternative method also creates large quantities of excess, low temperature steam, which can normally only be used to drive compressors in the Haber process unit at low thermal efficiency.

Bayonet reactors may be used for steam reforming. They can include two concentric tubes. The outer tube is open at a first end and blocked at a second end. Mixed feed of steam and hydrocarbons is introduced into an annulus between the tubes at the first end, flows to the second end of the tube through a catalytic reactor in the annulus, traverses at the second end to the inner tube through which the reformed syngas flows back to the first end and exits the bayonet tube. The heat of reaction is provided by both the furnace outside the outer tube and from the return gas in the inner tube.

In some embodiments of the present technology, more energy efficient resources can be used to drive compressors to produce ammonia. Some embodiments described herein can accomplish reduction of the steam consumption of the steam reformer used for ammonia production and reduction of the compressor requirements for compressing air and for recompressing returns from the hydrogen recovery unit in the ammonia synthesis unit. Further advantages of the present technology may include elimination of the secondary reformer, low temperature water gas shift unit, $CO_2$ absorber, $CO_2$ stripper, and/or methanator commonly used in existing methods. Other advantages may include reduction or elimination of the process gas boiler requirements for heat recovery from the hot syngas and of the hydrogen recovery unit. Other advantages of the present technology will be observed by those reasonably skilled in the art.

In some embodiments, heat is transmitted to the reforming reactor from a combustion fired furnace. The furnace may be fired by one or more of a recuperative burner or a regenerative burner. Recuperative burners perform the combustion air preheat function of the convective zone of the reformer and can replace most or all the functions of the convective zone of recovering heat from the combustion products to preheat boiler feed water, feedstock, and mixed feed and to raise and superheat steam. Recuperative and regenerative burners recover heat from the combustion products mainly to preheat the combustion air, thereby reducing the amount of fuel needed for heating and the amount of combustion products from which to recover heat. Because the thermal mass of the combustion products is greater than that of the combustion air alone, recuperative and regenerative burners can be used for additional heating purposes other than preheating the combustion air.

In some embodiments, the syngas exiting the reformer may be further cooled and may be reacted in a water gas shift reactor to form additional hydrogen. The shifted syngas is further cooled, and a hydrogen stream (e.g., at least 98% high purity hydrogen in some embodiments, and potentially 99% high purity hydrogen), is separated from the syngas in a hydrogen pressure swing adsorption (PSA) unit.

In some embodiments, air is separated into at least 90% high purity nitrogen, and in some embodiments at least 99% high purity nitrogen, in an air separation unit. The air separation unit may be a nitrogen PSA unit or a cryogenic air separation unit.

In some embodiments, the high purity hydrogen and high purity nitrogen are compressed and processed together in a Haber process ammonia synthesis unit.

The low levels of methane and argon in the mixed hydrogen and nitrogen feed to the Haber synthesis unit compared to their levels in conventional primary and secondary reforming may reduce the purge requirements in the synthesis unit along with the attendant recompression requirements.

The bayonet reactor provides numerous benefits, particularly for ammonia production. By cooling the reformed syngas against inlet process gas to the bayonet reactor, heat is recovered to produce hydrogen rather than to produce excess low value steam.

Secondly, conventional single pass reforming reactor tubes are constrained by the outlet system metallurgy to an outlet temperature of no more than about 880° C. Bayonet reactors can reform to peak reforming temperatures in excess of 900° C. with existing reformer tube metallurgy and then cool the syngas below 880° C. before the gas enters the outlet system.

In a combined primary and secondary reforming method, the primary reforming may need to leave enough unreacted methane in its outlet stream to react with all the oxygen in air provided in the secondary reformer. Elimination of a secondary reformer permits more complete conversion of the feedstock to hydrogen in the primary reformer, which is particularly made possible by reforming to the higher temperatures only possible with a bayonet reactor for the reasons cited above. With a bayonet reactor the primary reformer is used closer to its potential capacity or rate of hydrogen production.

In addition, it may be desirable to lower the energy requirements of the primary steam reformer by lowering the ratio of moles steam to atoms of carbon in the mixed feed ("S/C ratio") as much as possible or as desired. As the S/C ratio is lowered, more methane remains unconverted. At some reduction of the S/C ratio, the amount of methane left in the syngas causes the fuel value in the tail gas from the PSA unit to exceed the amount that can be used as fuel to heat the reformer furnace. If there is no other local use for the tail gas energy, the energy content of the tail gas may not be monetized. By reforming to higher peak temperatures than is possible in single pass reactors, bayonet reforming reactors reform more methane to hydrogen and accommodate lower S/C ratios without creating surplus methane in the PSA tail gas. In this way the lower S/C ratios possible with bayonet reactors lower the energy consumption of the steam reformer. Syngas with less residual steam content also requires less heat exchanger surface area to condense the steam while cooling the syngas to a suitable PSA inlet temperature.

In some embodiments of the present disclosure, the multiple compressors for compressing air from ambient to synthesis unit pressure and return synthesis gas from diminished purge gas flow are driven by means such as, for example, a steam turbine using inlet steam that is hotter than 550° C., a gas turbine, a combined cycle, an electric motor, or any other device generating power at lower cost than a steam reforming unit.

Referring now to FIG. 1, an example hydrogen production unit 1 including a bayonet reformer tube 3 in accordance with the present technology will be described. In the hydrogen production unit 1, preheated mixed feed is conveyed via line 2 to bayonet reformer tube 3, entering the annulus 4, flowing to the tip 5, and returning via inner tube 6. The mixed feed is both heated and converted to syngas containing hydrogen within the annulus 4, such as by reacting with a catalytic reactor material within the annulus 4. The syngas reaches a first temperature at the tip 4 of the bayonet reformer tube 3, and cools to a second temperature lower than the first temperature at the outlet of the inner tube 6 and in the outlet line 7, due at least in part to heat transfer from the syngas in the inner tube 6 to the mixed feed within the annulus 4.

The bayonet reformer tube 3 is at least partially disposed within reformer furnace 8. Burner 9 heats the reformer furnace 8, being supplied with air via line 10 and with tail gas as fuel from a PSA unit 135 via line 11. Any additional fuel needed is supplied by makeup fuel via line 12.

Line 101 conveys a hydrocarbon feedstock to a first feedstock heat exchanger 102 wherein the hydrocarbon feedstock is preheated against syngas from line 103. The preheated hydrocarbon feedstock is conveyed by line 104 from the first feedstock heat exchanger 102 to a second feedstock heat exchanger 105 wherein the hydrocarbon feedstock is further heated against combustion products from the reformer furnace 8 to a higher temperature suitable for desulfurization. Line 106 conveys the further heated hydrocarbon feedstock from the second feedstock heat exchanger 105 to a desulfurization unit 107, wherein the hydrocarbon feedstock is desulfurized.

Boiler feed water is conveyed via line 108 to a first feed water heat exchanger 109 wherein the boiler feed water is heated against syngas from line 110. The heated boiler feed water is conveyed via line 111 from the first feed water heat exchanger 109 to a second feed water heat exchanger 112 wherein the heated boiler feed water is vaporized to steam against syngas from line 113. The resultant steam is conveyed by line 114 from the second feed water heat exchanger 112 to a steam drum 115.

As some liquid phase water may condense within the steam drum 115, the steam drum 115 can distribute some liquid phase water via line 116 to a first steam drum heat exchanger 117 wherein the liquid phase water from the steam drum 115 is vaporized against syngas from line 7. The resultant steam is returned from the first steam drum heat exchanger 117 via line 118 back to the steam drum 115. The steam drum 115 can also distribute liquid phase water via line 119 to a second steam drum heat exchanger 120 wherein the liquid phase water is vaporized against combustion products from the furnace 8. The resultant steam is returned from the second steam drum heat exchanger 120 via line 121 to the steam drum 115.

Steam for reforming is conveyed from the steam drum 115 via line 122 to a reaction steam heat exchanger 123 wherein it is superheated against combustion products from the furnace 8. The superheated steam is conveyed via line 124 from the reaction steam heat exchanger 123 to line 125, wherein the superheated steam mixes with the feedstock exiting the desulfurization unit 107 via line 125. Line 125 further conveys the mixed feed of desulfurized feedstock and steam to a mixed feed heat exchanger 126, wherein the mixed feed is preheated against combustion products from the furnace 8. The preheated mixed feed is conveyed via line 2 from the mixed feed heat exchanger 126 to the bayonet reformer tube 3, wherein the preheated mixed feed is converted to syngas as described above.

Ambient air is inducted into an air heat exchanger 127 wherein the ambient air is preheated against combustion products from the furnace 8. The preheated air is conveyed via line 10 to the burner 9 wherein it combusts with tail gas and/or makeup fuel as described above in order to heat the furnace 8.

The syngas exiting the reformer via line 7 is sequentially cooled in one or more of the heat exchangers. For example, the syngas can be cooled in the first steam drum heat exchanger 117 by transferring heat to vaporize liquid phase water from the steam drum 115, and conveyed via line 113 to the second feed water heat exchanger 112 wherein it is further cooled by transferring heat to vaporize boiler feed water. The syngas can be further conveyed via line 128 to a water gas shift reactor 129 wherein the syngas reacts to form additional hydrogen. The relatively cooler syngas can additionally be conveyed via line 103 to the first feedstock heat exchanger 102 wherein it is cooled by transferring heat to preheat hydrocarbon feedstock, and/or conveyed via line 110 to the first feed water heat exchanger 109 wherein it is cooled by transferring heat to heat boiler feed water. The cooled syngas can be conveyed via line 130 to a fin fan heat exchanger 131 wherein it is cooled against ambient air and some of the steam content of the syngas condenses, conveyed via line 132 to a water knockout unit 133 wherein condensed water is removed from the syngas, and conveyed via line 134 to a pressure swing adsorption unit (PSA) 135 wherein the syngas is separated into a hydrogen rich stream and a tail gas stream. The hydrogen rich stream exits the PSA unit via line 136, and the tail gas containing the remainder of the syngas contents is conveyed via line 11 to the burner 9 wherein the tail gas is combusted as fuel along with fuel from line 12 to heat the furnace 8.

Upon combustion in the furnace 8, the products of combustion can sequentially pass through heat exchangers 126, 123, 105, 120, and 127, and exit the hydrogen production unit 1.

With reference to the remaining figures, the numerals in the figures correspond to equivalent or similar components of the various figures.

Figure 2:
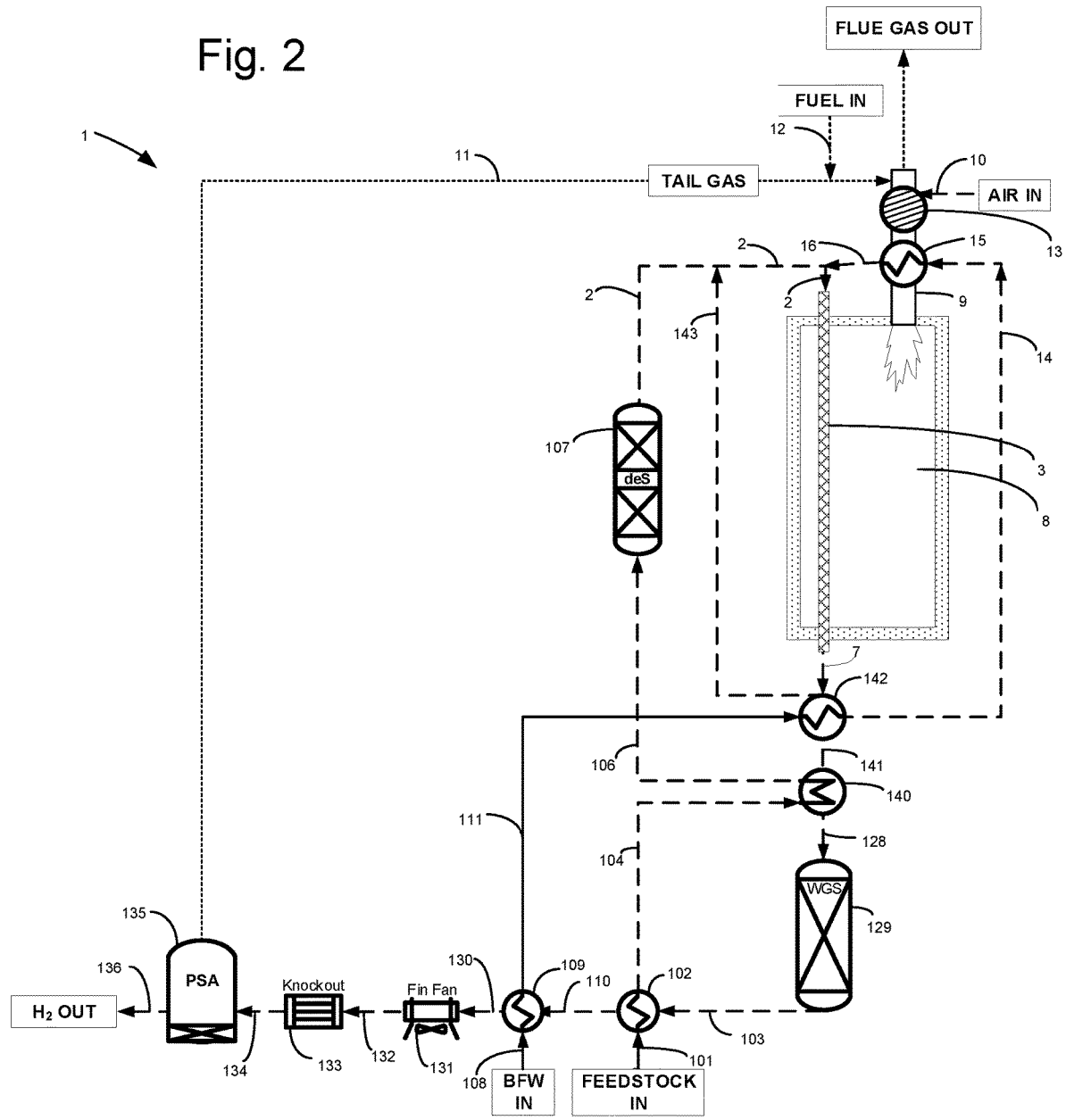
FIG. 2 schematically illustrates an example hydrogen production unit according to the present technology.

Referring now to FIG. 2, a further example hydrogen production unit 1 will now be described. The hydrogen production unit 1 of FIG. 2 differs from the hydrogen production unit 1 of FIG. 1 in a number of aspects and includes a single pass reformer tube 3 rather than a bayonet reformer tube. A mixed feed is conveyed via line 2 to single pass reformer tube 3 wherein the mixed feed is both heated and converted to syngas containing hydrogen. Syngas exits the single pass reformer tube 3 via outlet line 7.

The single pass reformer tube 3 is at least partially disposed within a reformer furnace 8. A recuperative burner 9 heats the reformer furnace 8, being supplied with air via line 10 and with tail gas as fuel from a PSA unit 135 via line 11. Any additional fuel needed is supplied by makeup fuel via line 12. The inducted air is preheated in a burner heat exchanger 13, which may be within the regenerative burner, against products of combustion from the furnace 8 before the air is combusted with fuel.

In some embodiments, a steam line 14 conveys steam to a reaction steam heat exchanger 15 within the burner wherein the steam is superheated against combustion products from the furnace 8. The superheated steam is conveyed via line 16 to line 2 wherein the superheated steam mixes with mixed feed and is conveyed into the single pass reformer tube 3.

Line 101 conveys a hydrocarbon feedstock to first feedstock heat exchanger 102 wherein the hydrocarbon feedstock is preheated against syngas from line 103. The preheated hydrocarbon feedstock is conveyed by line 104 from the first feedstock heat exchanger 102 to a second feedstock heat exchanger 140 wherein it is further heated against syngas from line 141 to a higher temperature suitable for desulfurization. Line 106 conveys the further heated hydrocarbon feedstock from the second feedstock heat exchanger 140 to a desulfurization unit 107 wherein the hydrocarbon feedstock is desulfurized.

Boiler feed water is conveyed via line 108 to a first feed water heat exchanger 109 wherein the boiler feed water is heated against syngas from line 110. The heated boiler feed water is conveyed via line 111 from the first feed water heat exchanger 109 to a second feed water heat exchanger 142 wherein the heated boiler feed water is vaporized to steam against syngas from line 7. The resultant steam is conveyed by line 143 from the second feed water heat exchanger 142 to line 2 wherein the superheated steam mixes with the feedstock exiting the desulfurization unit via line 2. The resultant mixed feed is conveyed via line 2 to the single pass reformer tube 3.

The syngas exiting the reformer via line 7 is sequentially cooled in the second feed water heat exchanger 142 where it is cooled by transferring heat to vaporize boiler feed water, and conveyed via line 141 to the second feedstock heat exchanger 140 wherein it is further cooled by transferring heat to hydrocarbon feedstock. The syngas is further conveyed via line 128 to a water gas shift reactor 129 wherein it reacts to form additional hydrogen, conveyed via line 103 to the first feedstock heat exchanger 102 wherein it is cooled by transferring heat to hydrocarbon feedstock, and conveyed via line 110 to the first feed water heat exchanger 109 wherein it is further cooled by transferring heat to preheat boiler feed water. The cooler syngas can further be conveyed via line 130 to a fin fan heat exchanger 131 wherein it is cooled against ambient air and some of the steam content of the syngas condenses, conveyed via line 132 to a water knockout unit 133 wherein condensed water is removed from the syngas, and conveyed via line 134 from the water knockout unit 133 to a pressure swing adsorption unit (PSA) 135 wherein the syngas is separated into a hydrogen rich stream and a tail gas stream. The hydrogen rich stream exits the PSA unit 135 via line 136, and the tail gas containing the remainder of the syngas contents is conveyed via line 11 to the burner 9 wherein the tail gas is combusted as fuel along with fuel from line 12 to heat the furnace 8.

In some embodiments, line 14 conveys a second stream of steam from the second feed water heat exchanger 142 to the reaction steam heat exchanger 15.

Upon combustion in the furnace 8, the products of combustion can sequentially pass through heat exchangers 15 and 13 wherein they are cooled and finally exit the hydrogen production unit 1.

Figure 3:
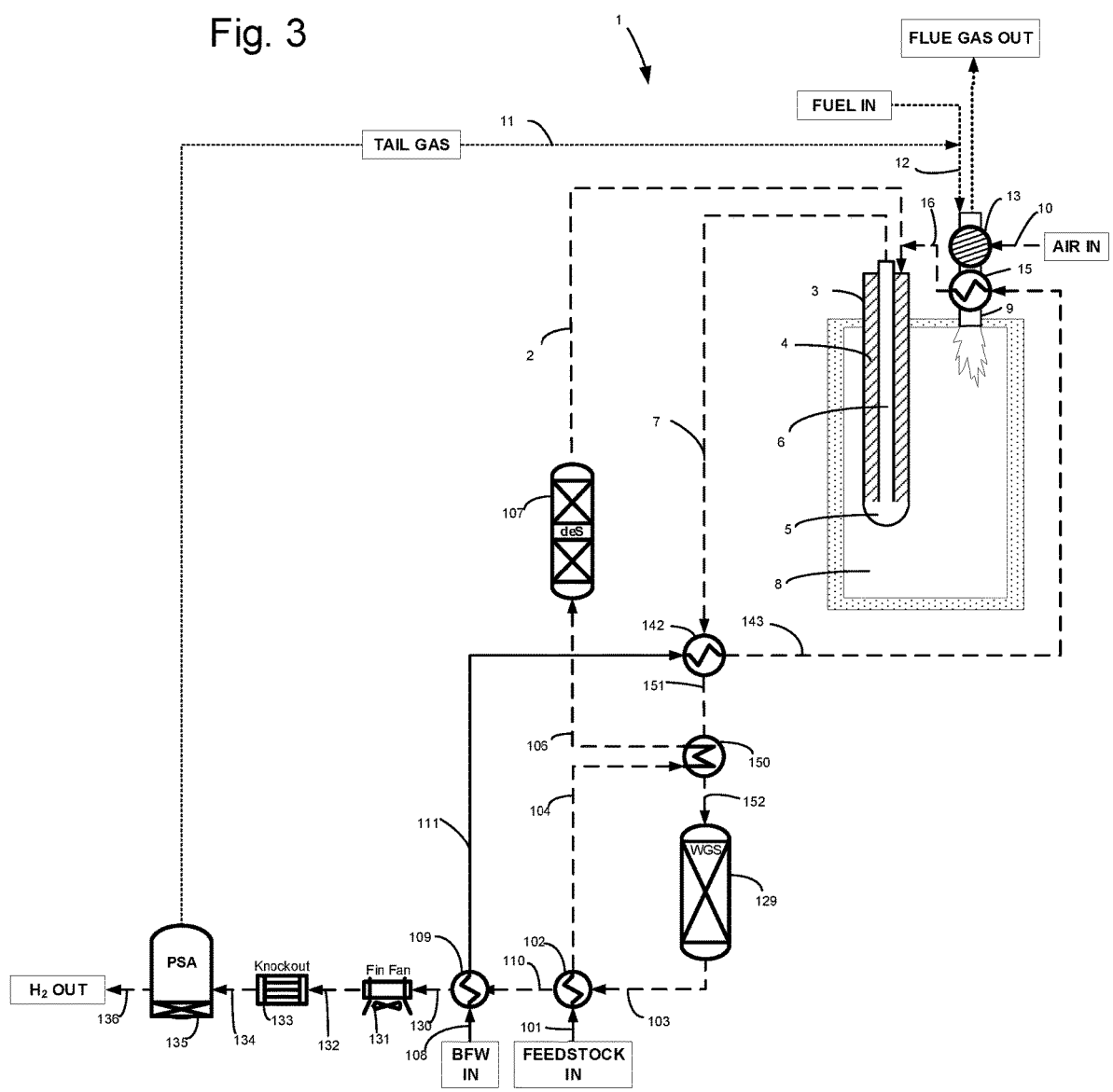
FIG. 3 schematically illustrates an example hydrogen production unit according to the present technology.

Referring now to FIG. 3, a further example hydrogen production unit 1 including a bayonet reformer tube 3 will be described. A mixed feed is conveyed via line 2 to a bayonet reformer tube 3, entering the annulus 4, flowing to the tip 5, and returning via the inner tube 6. The mixed feed is both heated and converted to syngas containing hydrogen in the annulus 4, reaching a first temperature at the tip 5, and cooling to a second temperature lower than the first temperature at the outlet of the inner tube 6 and in the outlet line 7.

The bayonet reformer tube 3 is within a reformer furnace 8. A recuperative burner 9 heats the furnace, being supplied with air via line 10 and with tail gas as fuel from a PSA unit 135 via line 11. Any additional fuel needed is supplied by makeup fuel via line 12. The inducted air is preheated in a burner heat exchanger 13, which may be within the regenerative burner, against products of combustion from the furnace 8 before the air is combusted with fuel.

Line 101 conveys a hydrocarbon feedstock to a first feedstock heat exchanger 102 wherein the hydrocarbon feedstock is preheated against syngas from line 103. The preheated hydrocarbon feedstock is conveyed by line 104 from the first feedstock heat exchanger 102 to a second feedstock heat exchanger 150 wherein it is further heated against syngas from line 151 to a temperature suitable for desulfurization. Line 106 conveys the further heated hydrocarbon feedstock from the second feedstock heat exchanger 150 to a desulfurization unit 107 wherein the hydrocarbon feedstock is desulfurized.

Boiler feed water is conveyed via line 108 to a first feed water heat exchanger 109 wherein the boiler feed water is heated against syngas from line 110. The heated boiler feed water is conveyed via line 111 from the first feed water heat exchanger 109 to a second feed water heat exchanger 142 wherein the heated boiler feed water is vaporized to steam against syngas from line 7. The resultant steam is conveyed by line 143 from the second feed water heat exchanger 142 to a reaction steam heat exchanger 15 within the burner wherein the steam is superheated against combustion products from the furnace 8. The superheated steam is conveyed via line 16 from the reaction steam heat exchanger 15 to line 2 wherein the superheated steam mixes with the feedstock exiting the desulfurization unit via line 2. The resultant mixed feed is conveyed via line 2 to the bayonet reformer tube 3.

The syngas exiting the reformer via line 7 is sequentially cooled in the second feed water heat exchanger 142 where it is cooled by transferring heat to vaporize boiler feed water, and conveyed via line 151 to the second feedstock heat exchanger 150 wherein it is further cooled by transferring heat to hydrocarbon feedstock. The syngas is further conveyed via line 152 to a water gas shift reactor 129 wherein it reacts to form additional hydrogen, conveyed via line 103 to the first feedstock heat exchanger 102 wherein it is cooled by transferring heat to hydrocarbon feedstock, and conveyed via line 110 to the first feed water heat exchanger 109 wherein it is further cooled by transferring heat to preheat boiler feed water. The cooler syngas can further be conveyed via line 130 to a fin fan heat exchanger 131 wherein it is cooled against ambient air and some of the steam content of the syngas condenses, conveyed via line 132 to a water knockout unit 133 wherein condensed water is removed from the syngas, and conveyed via line 134 from the water knockout unit 133 to a pressure swing adsorption unit (PSA) 135 wherein the syngas is separated into a hydrogen rich stream and a tail gas stream. The hydrogen rich stream exits the PSA unit 135 via line 136, and the tail gas containing the remainder of the syngas contents is conveyed via line 11 to the burner 9 wherein the tail gas is combusted as fuel along with fuel from line 12 to heat the furnace 8.

Upon combustion in the furnace 8, the products of combustion sequentially pass through heat exchangers 15 and 13 wherein they are cooled and finally exit the hydrogen production unit 1.

Figure 4:
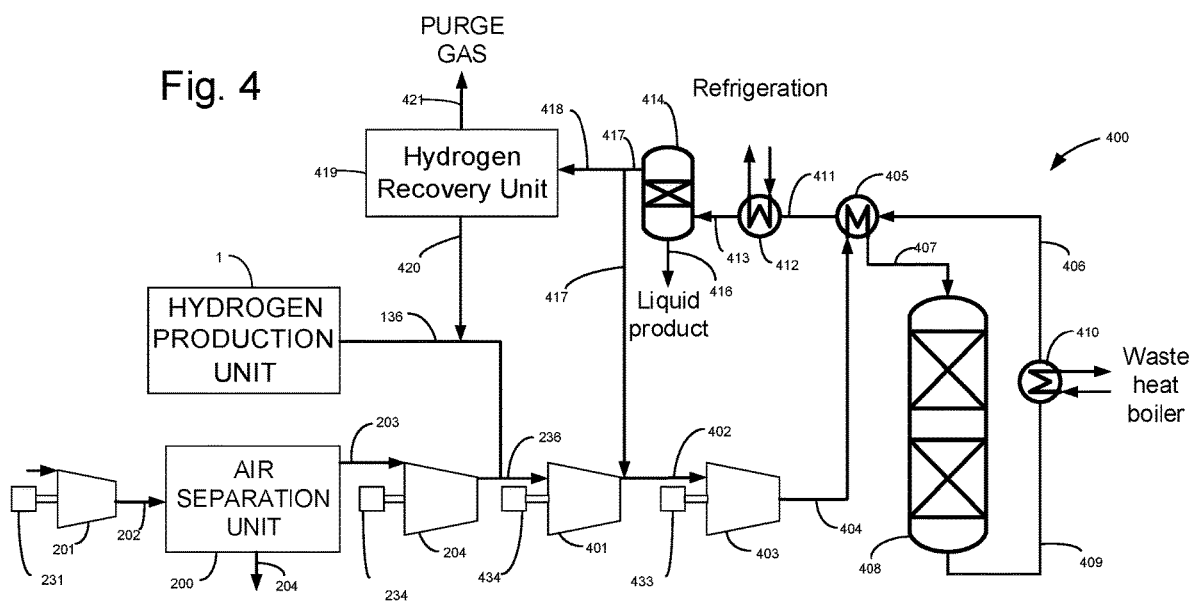
FIG. 4 schematically illustrates an example hydrogen production unit in combination with an air separation unit and an ammonia production unit according to the present technology.

Referring now to FIG. 4, example systems and methods for ammonia production will be described. An ammonia production unit 400 includes a hydrogen production unit 1 and a Haber process unit. The hydrogen production unit 1 may be, for example, any of the hydrogen production units 1 described herein with reference to FIGS. 1-3. A hydrogen rich stream is supplied by line 136 from the hydrogen production unit 1 to a Haber process unit, and a nitrogen rich stream is supplied by line 236 from an air separation unit 200 to the Haber process unit.

Ambient air is inducted into a first compressor 201 and compressed to a first pressure for separation of the nitrogen from the air. The compressed air may be cooled in a heat exchanger (not shown) and conveyed to the air separation unit 200 via line 202. The air separation unit 200 may be, for example, of the cryogenic or molecular sieve type. In some embodiments the air separation unit 200 is preferably cryogenic, producing a nitrogen rich stream of at least 99% molar nitrogen purity and more preferably at least 99.9% molar purity. Line 203 conveys the nitrogen rich stream from the air separation unit 200 to a second compressor 204 wherein the nitrogen rich stream is compressed to the pressure of the hydrogen in line 136. Line 236 conveys the compressed nitrogen from compressor 204 to line 136 where it is mixed with the hydrogen rich stream at a ratio such as, for example, approximately three moles of hydrogen to one mole of nitrogen, and is conveyed to a third compressor 401 wherein the mixture is further compressed. The mixture is conveyed by line 402 from the third compressor 401 to a fourth compressor 403 wherein the mixture along with recirculated gas from line 417 is compressed. In some embodiments, the fourth compressor 403 compresses the mixture and the recirculated gas to a pressure of 150 to 250 bar(g).

The fully compressed gas is conveyed via line 404 from the fourth compressor 403 to a heat exchanger 405 wherein the compressed gas is heated against ammonia bearing gas from line 406. The heated gas is conveyed via line 407 from the heat exchanger 405 to an ammonia synthesis reactor 408 wherein it is exposed to a suitable catalyst and exothermically reacted to a stream of higher ammonia concentration. The reacted gas is conveyed via line 409 from the ammonia synthesis reactor 408 to a waste heat boiler 410 wherein it is cooled against boiler feed water, resulting in the boiler feed water being vaporized to steam. The cooled reacted gas is conveyed via line 406 from the waste heat boiler 410 to the heat exchanger 405 wherein it is further cooled against the incoming gas from line 404. The further cooled gas is conveyed via line 411 from the heat exchanger 405 to a refrigeration unit 412 wherein it is refrigerated against a refrigerant and some ammonia condenses from the gas. The resultant gas and liquid are conveyed via line 413 from unit 412 to a phase separator 414 wherein the liquid and gas phases are separated. Liquid ammonia exits the phase separator 414 via line 416, and the remainder gaseous mixture is recirculated via line 417 from the phase separator 414 to line 402 and then to the fourth compressor 403 wherein the recirculated gas is re-pressurized for recirculation to the ammonia synthesis reactor.

A portion of the gas in line 417 is metered and purged to line 418 and then into hydrogen recovery unit 419 wherein some of the hydrogen is separated into a hydrogen rich stream from the remainder of the purged gas. The hydrogen rich stream is conveyed via line 420 to line 136 or line 236 and then to the third compressor 401 wherein it is compressed along with makeup hydrogen from line 136 and makeup nitrogen from line 236 for reintroduction to the ammonia synthesis reactor 408. The purge gases separated from the recovered hydrogen are conveyed via line 421 such as to burners in the hydrogen production unit 1 (e.g., to burners 9 as shown in FIGS. 1, 2, and 3) where they are combusted.

The first compressor 201 is driven by a driver 231. The second compressor 204 is driven by a driver 234. The third compressor 401 is driven by a driver 431. The fourth compressor 403 is driven by a driver 433. One or more of the drivers 231, 234, 431, and 433 can be, for example, a gas turbine, a steam turbine utilizing an inlet steam at a temperature greater than 550° C. and more preferably 600° C., a combined cycle turbine set, an electric motor, or any other suitable driver.

Advantageously, in some embodiments, some or all of the drivers 231, 234, 431, and 433 may be powered by a source other than steam from the hydrogen production unit 1. As described above, while excess steam from a steam reformation process has conventionally been used to drive compressors in ammonia production methods, such steam is typically inefficient for this purpose. Using an alternative power source, such as gas, electricity, or a separate source of high-temperature steam to drive the compressors reduces or eliminates any need to produce excess steam at the hydrogen production unit 1. Accordingly, the hydrogen production units 1 of FIGS. 1-3 can advantageously be designed as described herein to use most or substantially all (e.g., at least 90%) of the steam raised therein for the production of hydrogen or other reagents rather than for driving compressors for a Haber process unit, increasing the overall efficiency of the ammonia production process.

The foregoing description details certain embodiments of the systems, devices, and methods disclosed herein. It will be appreciated, however, that no matter how detailed the foregoing appears in text, the systems, devices, and methods can be practiced in many ways. It should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The term "comprising" as used herein is synonymous with "including," "containing," or "characterized by," and is inclusive or open-ended and does not exclude additional, unrecited elements or method steps.

What is claimed is:

1. A method of producing ammonia within a combination of a hydrogen production unit and a Haber process unit, the method comprising:
   reforming reactants of steam and a hydrocarbon feedstock in a bayonet reforming reactor tube in the hydrogen production unit to produce a reformate syngas at a first temperature;
   cooling the reformate within the bayonet reforming reactor tube to a second temperature lower than the first temperature;
   separating the reformate syngas in a pressure swing adsorption unit to produce a high purity hydrogen stream containing at least 90% hydrogen by volume and a tail gas stream;
   separating air in an air separation unit to produce a high purity nitrogen stream containing at least 90% nitrogen by volume;
   combining the high purity hydrogen stream and the high purity nitrogen stream into a mixture; and
   compressing and processing the mixture in a Haber process unit comprising at least one compressor,
   wherein at least 90% of the steam is consumed in the hydrogen production unit to produce the high purity hydrogen stream.

2. The method of claim 1, wherein the steam is generated by cooling the reformate syngas against boiler feed water in one or more heat exchangers.

3. The method of claim 2, wherein the one or more heat exchangers comprise:
a first feed water heat exchanger configured to transfer heat from the reformate syngas to heat the boiler feed water; and
a second feed water heat exchanger configured to transfer heat from the reformate syngas to vaporize the heated boiler feed water;
wherein the reformate syngas passes through the second feed water heat exchanger before passing through the first feed water heat exchanger.

4. The method of claim 1, wherein the at least one compressor is driven by a driver comprising at least one of a gas turbine, a steam turbine utilizing inlet steam at a temperature greater than 550° C., a combined cycle turbine set, or an electric motor.

5. The method of claim 1, wherein the bayonet reforming reactor tube is heated at least in part by combustion of the tail gas stream.

6. The method of claim 1, wherein processing the mixture in the Haber process unit yields liquid ammonia and a remainder gaseous mixture, and wherein at least a portion of the remainder gaseous mixture is recycled within the Haber process unit.

7. The method of claim 6, wherein the bayonet reforming reactor tube is heated at least in part by combustion of a portion of the remainder gaseous mixture.

8. A method of producing ammonia within a combination of a hydrogen production unit and a Haber process unit, the method comprising:
reforming reactants of steam and a hydrocarbon feedstock to produce a reformate syngas in steam reforming reactor at least partially disposed within a furnace of the hydrogen production unit;
separating the reformate syngas in a pressure swing adsorption unit to produce a high purity hydrogen stream containing at least 90% hydrogen by volume and a tail gas stream;
separating air in an air separation unit to produce a high purity nitrogen stream containing at least 90% nitrogen by volume;
combining the high purity hydrogen stream and the high purity nitrogen stream into a mixture; and
compressing and processing the mixture in a Haber process unit containing at least one compressor,
wherein the furnace of the hydrogen production unit is heated by a burner and a heat exchanger, and
wherein combustion air for the burner is preheated to at least 500° C. in the heat exchanger against combustion products of the furnace.

9. The method of claim 8, wherein at least 90% of the steam is consumed in the hydrogen production unit to produce the high purity hydrogen stream.

10. The method of claim 9, wherein the steam is generated by cooling the reformate syngas against boiler feed water in one or more heat exchangers.

11. The method of claim 10, wherein the one or more heat exchangers comprise:
a first feed water heat exchanger configured to transfer heat from the reformate syngas to heat the boiler feed water; and
a second feed water heat exchanger configured to transfer heat from the reformate syngas to vaporize the heated boiler feed water;
wherein the reformate syngas passes through the second feed water heat exchanger before passing through the first feed water heat exchanger.

12. The method of claim 8, wherein the at least one compressor is driven by a driver comprising at least one of a gas turbine, a steam turbine utilizing inlet steam at a temperature greater than 550° C., a combined cycle turbine set, or an electric motor.

13. The method of claim 8, wherein the furnace is heated at least in part by combustion of the tail gas stream.

14. The method of claim 8, wherein processing the mixture in the Haber process unit yields liquid ammonia and a remainder gaseous mixture, and wherein at least a portion of the remainder gaseous mixture is recycled within the Haber process unit.

15. The method of claim 14, wherein the furnace is heated at least in part by combustion of a portion of the remainder gaseous mixture.

16. The method of claim 8, wherein the steam reforming reactor comprises a single pass reforming reactor tube.

17. The method of claim 8, wherein the steam reforming reactor comprises a bayonet reforming reactor tube.

* * * * *